United States Patent [19]

Naganoma et al.

[11] 4,408,712
[45] Oct. 11, 1983

[54] APPARATUS FOR CONTROLLING AIR CONDITIONERS FOR AUTOMOBILES

[75] Inventors: Masanori Naganoma, Kariya; Kazuaki Takemoto, Anjo; Mitsutoshi Moriya, Gamagori, all of Japan

[73] Assignee: Nippondenso Co., Ltd., Kariya, Japan

[21] Appl. No.: 386,266

[22] Filed: Jun. 8, 1982

[30] Foreign Application Priority Data

Jun. 11, 1981 [JP] Japan ................................ 56-90625

[51] Int. Cl.$^3$ ........................ G05D 23/00; B60H 3/00
[52] U.S. Cl. ...................................... 236/13; 165/43; 236/49; 236/91 D
[58] Field of Search ............... 165/28, 42, 43; 236/49, 236/91 R, 91 D, 13

[56] References Cited

U.S. PATENT DOCUMENTS 4,291,749 9/1981 Ootsuka et al. .................. 164/43 X
4,311,188 1/1982 Kojima et al. .................... 236/91 D
4,328,855 5/1982 Iwata et al. ....................... 165/43 X

FOREIGN PATENT DOCUMENTS 49-6021  2/1974 Japan .
54-12819 6/1979 Japan .
54-31468 10/1979 Japan .
54-31469 10/1979 Japan .
55-47914 4/1980 Japan .

Primary Examiner—William E. Wayner
Attorney, Agent, or Firm—Cushman, Darby & Cushman

[57] ABSTRACT

An apparatus for controlling an air conditioner for an automobile comprises: an air conditioning unit including a heater unit for heating air passing through an air supply duct and a device for adjusting the amount of air passing through said duct, an air distributing unit for effecting switching among a plurality of air supply outlets into a compartment of the automobile, the unit including a ventilation supply outlet, and an air bypass containing an air valve for supplying cool air upstream of the heater unit to the ventilation supply outlet; a compartment temperature setting unit for setting a desired temperature value within the compartment; sensing units for sensing the temperature within the compartment and the amount of insolation in the compartment; a processing unit responsive to output signals from the compartment temperature setting unit and the sensing units for determining the desired temperature of air supplied to the compartment and for deciding relationships between the air supply temperature and the sensed insolation amount in accordance with preset values corresponding thereto; and means for actuating the air distributing unit and the air valve within the air bypass in response to output signals of the processing unit, whereby the apparatus maintains the temperature within the compartment at the desired value and controls the supply of cool air through the air bypass in response to the sensed insolation amount.

4 Claims, 2 Drawing Figures

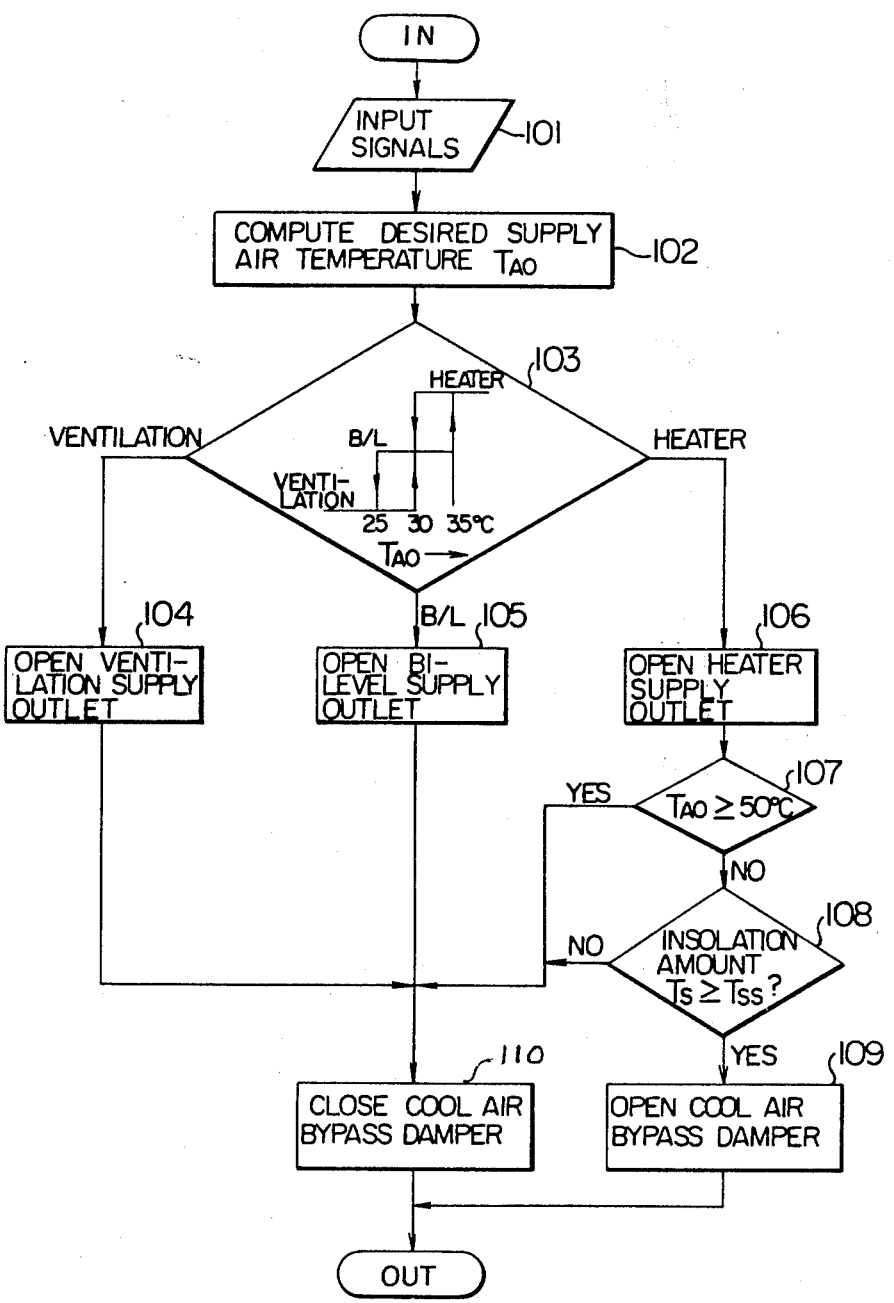

APPARATUS FOR CONTROLLING AIR CONDITIONERS FOR AUTOMOBILES

BACKGROUND OF THE INVENTION

1. Field of the Invention

The present invention relates to improvements in an apparatus for controlling air conditioners for automobiles having a plurality of air supply outlets and designed to determine the distribution of conditioned air supplied to a vehicle compartment through the air supply outlets.

2. Description of the Prior Art

It is well known in the art to vary the distribution of air blown into the upper and lower portions of a compartment of a vehicle. For instance, disclosed in Japanese Laid-Open Patent Application Publication No. 55-47914 is a system in which, in accordance with the temperature of air supplied to the vehicle compartment, cooled air is blown into the upper portion of the compartment and heated air is blown into the lower portion of the compartment. Also, similar systems are disclosed in Japanese Utility Model Publication No. 54-12819, etc. Thus, in these known systems heated air is blown into the lower portion of the vehicle compartment in winter. However, if an occupant is exposed to the heat from the sun impinging on the vehicle compartment during such heater supply mode of operation, the upper part of the body of the occupant is exposed to the sun's heat, so that sometimes the occupant has a sensation of excessive heat in the upper part of the body. However, air supplied from an air conditioner does not effectively reach the upper part of the body to lessen the sensation of the excessive heat and thus reduce the discomfort of the occupant.

In this connection, air-conditioning systems of the type incorporating an automatic temperature adjusting unit for correcting the air supply temperature in accordance with the intensity of solar radiation (insolation) are known in the art (Japanese Utility Model Publication No. 49-6021, etc.) In such a system, the temperature of the air supply is decreased in accordance with the degree of insolation with the result that during the above-mentioned heater supply mode of operation, the temperature of the air directed towards the lower part of the occupant's body is decreased causing the occupant to feel cold, and this, coupled with a sensation of heating in the upper part of the body, aggravates the discomfort of the occupant.

With respect to the air-conditioner control systems set forth in Japanese Utility Model Publications No. 54-31468 and No. 54-31469, there is disclosed a method of cancelling or reducing the insolation correction during the heater supply mode of operation with a view to overcoming the foregoing deficiencies due to the insolation correction.

However, this method is incapable of improving the feeling on the upper part of the occupant's body.

SUMMARY OF THE INVENTION

With a view to overcoming the foregoing deficiencies in the prior art, it is an object of the present invention to provide an improved apparatus for controlling air conditioners for automobiles in which, when an air conditioner is in the heater supply mode of operation and a level of insolation exceeding a predetermined level is sensed, conditioned air of a low temperature is automatically blown toward the upper part of an occupant's body from a ventilation supply outlet, thus improving the feeling on the part of the occupant.

It is another object of the present invention to provide an improved apparatus for controlling air conditioners for automobiles so designed that a condition requiring strong heating is automatically detected. Upon detection of such a condition, the air conditioning control for improving the feeling of the occupant is interrupted and strong heating is initiated.

An air conditioning apparatus according to the present invention includes an air duct, a heater unit for heating air passing through the air duct with the heating effect thereof made adjustable, an air distributing unit for distributing air to a ventilation supply outlet and/or a heater supply outlet, and an air bypass provided with an air bypass valve therein for supplying air upstream of the heater unit to the ventilation supply outlet, whereby, when the air bypass valve disposed in the air bypass is open, the conditioned air of a low temperature is blown from the ventilation supply outlet despite the air conditioning apparatus being in the heater supply mode of operation.

In order to operate the air valve, there is provided an electric control unit having an input device for determining a temperature control condition within a compartment of an automobile and the amount of insolation into the compartment of the automobile. The control unit operates: to determine a necessary adjustment of the heater unit, to decide a condition at which the necessary adjustment amount is within a predetermined range required to effect a certain extent of heating and whether the amount of insolation is at or less than a predetermined level, at that time, and to open the air valve when the amount of insolation exceeds the predetermined level.

The electric control unit preferably uses a digital computer which repeatedly executes a predetermined processing operation in accordance with a series of control programs as shown in an embodiment described later. However, the electric control apparatus may use two independent electrical circuits but connected electrically interconnected to determine the necessary adjustment amount of the heater unit and to decide the subsequent conditions.

BRIEF DESCRIPTION OF THE DRAWINGS

FIG. 2 is a flow chart showing the processing steps of the control program for the microcomputer shown in FIG. 1.

DESCRIPTION OF THE PREFERRED EMBODIMENT

Figure 1:
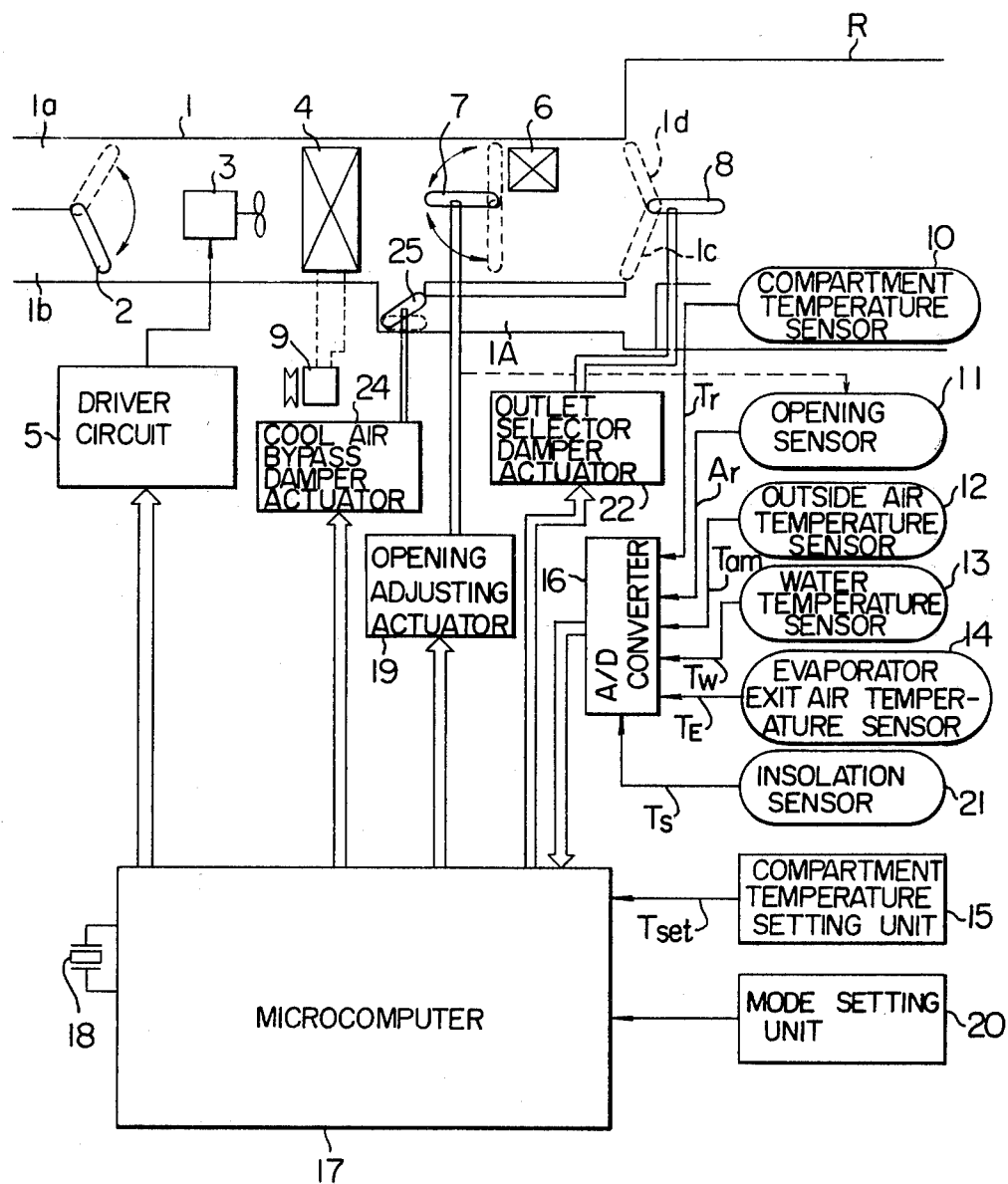
FIG. 1 shows an overall construction of the apparatus for controlling air conditioners for automobiles according to an embodiment of the present invention.

The present invention will be described with reference to an embodiment thereof illustrated in the accompanying drawings.

In FIG. 1, the reference numeral 1 denotes an air duct for passing the cooling and heating air for use in a unit for conditioning the air of an automobile. The air duct 1 is provided with an outside air inlet 1a for introducing outside air therethrough and an inside air inlet 1b for introducing the vehicle compartment's air therethrough for the circulation thereof. The reference numeral 2 denotes an inside and outside air switching damper for manually switching between outside air introduction and inside air circulation. The solid line indicates the outside air introducing state of the switching damper 2, while the broken line indicates the inside air circulating state of the switching damper 2. The numeral 3 denotes an electric blower for taking in air from the outside air inlet 1a or the inside air inlet 1b to supply it to a vehicle compartment R. The numeral 4 denotes an evaporator disposed across the inner wall of the air duct 1 and operating as a cooling unit to cool the air taken in by the electric blower 3 and to pass the air therethrough.

The reference numeral 9 denotes a compressor for compressing and circulating a coolant. The compressor 9 is coupled with an engine, which is a prime mover of the automobile, by way of a belt, and it operates its rotational driving force to compress the coolant and supply it to a condenser (not shown) thereby to liquidize the pressurized coolant, to turn the liquidized coolant into a liquid of low pressure and a low temperature through an expansion valve (not shown), to supply the coolant to the evaporator 4 so that it absorbs heat from the air passing through the evaporator 4 thereby turning the coolant into a gas of low pressure and low temperature, and then to circulate the coolant. The compressor 9 includes an electromagnetic clutch (not shown) to obtain coupling with the engine. When the electromagnetic clutch is energized, the compressor 9 is coupled with the engine, but when the electromagnetic clutch is not energized, the compressor 9 is disconnected from the engine.

The reference numeral 6 denotes a heater core disposed within the air duct 1 and operating as a heater which has introduced therewithin the cooling water from the engine so that the heat of the engine cooling water heats the air passing through the air duct 1. The reference numeral 7 denotes an air-mixing damper for adjusting the proportion of the amount of air supplied to the side of the heater core 6 to be heated and the amount of air bypassing the heater core 6, both amounts being components of the dried and cooled air passing through the evaporator 4. The damper 7 thereby adjusts the air temperature in accordance with the mixing proportion of the cooled air and the heated air so as to desirably condition air supplied to compartment R. The air-mixing damper 7 and the heater core 6 form an adjustable heater unit. The opening of the air-mixing damper 7 is automatically controlled to maintain the temperature within the compartment at a desired value in accordance with various information such as the inside air temperature, outside air temperature, a present desired temperature, a damper opening feedback signal, etc.

The reference numeral 8 denotes an outlet selector damper for determining the mode of air supply from the air duct 1 to the compartment. This damper allows the selection of at least three positions for switching between a ventilation supply outlet 1c and a heater supply outlet 1d, both as shown by the broken lines in FIG. 1, or a bi-level combined supply as shown by the solid line. The ventilation supply outlet 1c is provided with a bypass 1A for bypassing the heater unit 6 and 7. When a cool air bypass damper 25 is opened as shown by the broken line in FIG. 1, cool air which is not heated by the heater unit is blown out from the ventilation supply outlet 1c.

The reference numeral 10 denotes a compartment temperature sensor for detecting the temperature within the compartment R to produce a compartment temperature signal $T_r$. The reference numeral 11 denotes the sensor for detecting an opening position of the air-mixing damper 7 to produce an opening signal $A_r$. Sensor 11 is controlled to produce the opening signal by a potentiometer (not shown) interlinked with the movement of the air-mixing damper 7. This input to sensor 11 is generally indicated by a broken line in FIG. 1. The reference numeral 12 denotes an outside air temperature sensor for sensing the temperature of air outside of the compartment to produce an outside air temperature signal. The reference numeral 15 denotes a compartment temperature setting unit for setting the temperature within the vehicle compartment to a desired value. The occupant can manually set unit 15 to a digital value for a desired compartment temperature. The reference numeral 13 denotes a water temperature sensor for sensing the temperature of the engine cooling water at the water inlet to the heater core 6. The reference numeral 14 denotes an evaporator exit air temperature sensor for sensing the air temperature at the air exit of the evaporator 4. The reference numeral 20 denotes a mode setting unit for manually setting various operational modes such as a heater mode, a defroster mode, a cooling mode, etc., and it produces respective digital setting mode signals corresponding to the mode selected by the vehicle's occupant. The reference numeral 16 denotes an A/D converter for converting analog signals to digital signals. It converts the compartment temperature signal $T_r$ from the compartment temperature sensor 10, the opening signal $A_r$ from the opening sensor 11, the outside air temperature signal $T_{am}$ from the outside air temperature sensor 12, the water temperature signal $T_w$ from the water temperature sensor 13 and the evaporator exit air temperature signal $T_E$ from the evaporator exit air temperature sensor 14 to respective digital signals sequentially.

The reference numeral 17 denotes a microcomputer having an operational processor of a single chip construction for performing operational processing in accordance with a preset air conditioning control program. The microcomputer 17 has a crystal oscillator 18 of a frequency of several MHz connected thereto and is supplied with a stabilized voltage from a regulated power supply circuit (not shown), the circuit generating a stabilized voltage from the power supply voltage of a battery (not shown) mounted on the vehicle. The microcomputer 17 performs its operational processing to produce a command signal for adjusting the rotational speed of the electric blower 3, a command signal for effectively actuating and de-actuating the compressor 9, a command signal for adjusting the opening of the air-mixing damper 7, a command signal for determining the position of the outlet selector damper 8, and a command signal for determining the position of the cool air bypass damper 25.

The microcomputer 17 is composed of a single chip large scale integrated circuit (LSI) which comprises, as its main part, a read only memory (ROM) for storing the air conditioning control program consisting of processing steps for producing the above-mentioned command signals, a central processing unit (CPU) for sequentially reading the air conditioning control program from the ROM to execute the operational processing corresponding thereto, a random access memory (RAM) which temporarily stores various data related to the operational processing of the CPU and which allows the CPU to read the data, a clock pulse generator controlled by the crystal oscillator 18 for generating a reference clock pulse for use in the above-mentioned various operational processings, and an input/output (I/O) circuit section for controlling the inputting and outputting of the respective signals.

The reference numeral 19 denotes an opening adjusting actuator for adjusting the opening of the air-mixing damper 7. The opening adjusting actuator 19 operates in response to the opening command signal produced by the microcomputer 17 in accordance with its operational processing. The reference numeral 5 designates a driver circuit for controlling the rotational speed of the electric blower 3 in response to a signal from the microcomputer 17.

The reference numeral 22 denotes an actuator for determining the position of the outlet selector damper 8, and it controls the position of the outlet selector damper 8 in response to a command signal from the microcomputer 17. The reference numeral 24 designates an actuator for determining the position of the cool air bypass damper 25. It also controls the opening and closing of the cool air bypass damper 25 in response to a command signal from the microcomputer 17.

The operation of the above-described construction now will be explained further with reference to the flow chart shown in FIG. 2. The flow chart illustrates the operations involved in the adjustment of the positions of the outlet selector damper 8 and the cool air bypass damper 25 which are features of the present invention. With respect to the other control functions, it is possible to refer to known related arts.

When the microcomputer 17 runs, it performs its operational processing in accordance with the air conditioning control program, represented by the FIG. 2 flow chart, within a time period of several hundreds msec. Firstly, a signal inputting step 101 inputs and stores the compartment temperature signal $T_r$, the outside air temperature signal $T_{am}$, the evaporator exit air temperature signal $T_E$, the water temperature signal $T_W$, the air-mixing damper opening signal $A_r$ and the insolation amount signals $T_s$. These inputs are converted to the respective digital signals through the A/D converter 16 and are inputted to the microcomputer together with the further inputs comprising the output of the mode setting unit 20 and the compartment temperature setting signal $T_{set}$. The processing proceeds to produce a desired air supply temperature $T_{AO}$ by computing step 102. In step 102, the desired air supply temperature $T_{AO}$ is obtained from the following equation in accordance with the data which the step 101 has input and stored:

$$T_{AO} = K_{set} \times T_{set} - K_r \times T_r - K_{am} \times T_{am} - K_s T_s + C$$

(where $K_{set}$, $K_r$, $K_{am}$, $K_s$ and C are predetermined constants, respectively.)

The next step 103 decides an appropriate supply outlet in accordance with the value of the desired supply air temperature $T_{AO}$ obtained by the computation. If the value of $T_{ao}$ is 25° C. and below, the ventilation supply mode is selected, and step 104 outputs a signal for opening the ventilation supply outlet 1c. The cool air bypass damper 25 is maintained closed at this time, as shown by a flowline leading from the step 104 to a step 110. If $T_{AO}$ is 30° C., the bi-level supply mode is selected, and step 105 outputs a signal for establishing the bi-level supply outlet position. The cool air bypass damper 25 is maintained closed at this time as well, as shown by a flowline leading from the step 105 to the step 110. If $T_{AO}$ is 35° C. or more, the heater supply mode is selected, and step 106 outputs a signal for opening the heater supply outlet 1d, and the processing proceeds to step 107.

Step 107 decides whether or not the value of $T_{AO}$ is 50° C. or more. If it is, step 107 branches to YES to maintain the cool air bypass damper 25 closed, as shown by a flowline leading from the step 107 to the step 110. On the other hand, if $T_{AO}$ is less than 50° C., step 107 branches to NO and the processing proceeds to step 108. Step 108 decides whether the insolation amount $T_s$ is less than a preset value $T_{ss}$ in accordance with the insolation data which was inputted and stored at the signal inputting step 101. If the insolation amount $T_s$ is less than the preset value $T_{ss}$, step 108 branches to NO to maintain cool air bypass damper 25 closed, as shown by a flowline leading from the step 108 to the step 110. However, if $T_s$ is not less than $T_{ss}$, the step 108 branches to YES and the processing proceeds to step 109. Step 109 outputs a signal for opening the cool air bypass damper 25, which allows cool air, which has bypassed the air-mixing chamber, to blow out from the ventilation supply outlet 1c despite the air supply being in the heater supply mode at this time. Thus, the apparatus according to the present invention operates repeatedly to execute the control program so that the position of the air mixing damper 7 is controlled to maintain the vehicle compartment temperature $T_r$ at the preset compartment temperature $T_{set}$ notwithstanding variations of the environmental conditions and the performance of the cooling unit and the heater unit. In addition, it is possible to effect appropriate air supply control by controlling the cool air bypass damper 25 in accordance with the magnitude of the detection signal from the insolation sensor 21 and the desired supply air temperature $T_{AO}$ obtained by the computation.

We claim:

1. An apparatus for controlling an air conditioner for an automobile comprising:
    an air conditioning unit including an air duct, a heater unit having means for heating air passing through said air duct and means for adjusting the amount of air passing said heater unit, an air distributing unit for switching among a plurality of positions of air supply outlets into a compartment of said automobile, said outlets including a ventilation supply outlet, and an air bypass containing an air valve therewithin for supplying cool air upstream of said heater unit to said ventilation supply outlet;
    a compartment temperature setting unit for setting a desired value for temperature within said compartment;
    sensing units for sensing the temperature within said compartment and the amount of insolation into said compartment, respectively;
    a processing unit responsive to output signals from said compartment temperature setting unit and said sensing units for computing a desired temperature of supply air into said compartment, determining the positions of the air supply outlets of said air distributing unit in accordance with the desired supply air temperature, deciding whether the desired supply air temperature is lower than a first preset value and whether the sensed insolation amount is less than a second preset value, and producing output signals indicative of the results of the determination and decisions; and
    actuator means for actuating said air distributing unit and said air valve disposed within said air bypass in response to the output signals of said processing unit, whereby the temperature within said compartment is maintained at the desired value and the supply of cool air through said air bypass is controlled in response to the insolation amount.

2. An apparatus according to claim 1, wherein said air supply outlets of said air distributing unit of said air conditioning unit include; a heater supply outlet and wherein said air distributing unit comprises a damper which is driven to three positions for opening each one or both of said ventilation supply outlet and said heater supply outlet.

3. An apparatus according to claim 1, wherein said means for adjusting the amount of air passing the heater unit comprises: an air-mixing damper for adjusting the proportion of air passing through a heater section of said heater unit and air bypassing said heater section; and means for adjusting said air-mixing damper in response to an output signal of said processing unit.

4. An apparatus according to claim 1, wherein said air conditioning unit further includes an electric blower disposed within said air duct and a driver unit for controlling the rotational speed of said electric blower in response to an output signal of said processing unit.

* * * * *